(12) United States Patent
Jonsson et al.

(10) Patent No.: US 8,690,443 B2
(45) Date of Patent: Apr. 8, 2014

(54) MECHANICAL SYSTEM FOR HIGH ACCELERATION ENVIRONMENTS

(75) Inventors: Ulf J. Jonsson, South Windsor, CT (US); Michael F. Mullen, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 213 days.

(21) Appl. No.: 12/984,702

(22) Filed: Jan. 5, 2011

(65) Prior Publication Data

US 2011/0164979 A1    Jul. 7, 2011

Related U.S. Application Data

(60) Provisional application No. 61/292,232, filed on Jan. 5, 2010.

(51) Int. Cl.
*F16C 13/00* (2006.01)
(52) U.S. Cl.
USPC .......................................... 384/470; 384/464
(58) Field of Classification Search
USPC ................... 384/462, 464, 470, 572
See application file for complete search history.

(56) References Cited

U.S. PATENT DOCUMENTS

| 3,013,971 | A |   | 12/1961 | Mastin |
| 3,198,735 | A |   | 8/1965  | Lamson et al. |
| 3,698,514 | A |   | 10/1972 | Buck et al. |
| 3,963,284 | A | * | 6/1976  | Bouchard ............... 384/464 |
| 4,906,110 | A |   | 3/1990  | Van Wyk et al. |
| 5,575,570 | A | * | 11/1996 | Uchiyama et al. ........ 384/470 |
| 5,918,986 | A | * | 7/1999  | Matsui et al. ............ 384/470 |
| 6,332,717 | B1 | * | 12/2001 | Oohira et al. ............ 384/470 |
| 6,357,922 | B1 |  | 3/2002  | Harbottle et al. |
| 6,439,208 | B1 |  | 8/2002  | Jones |
| 6,802,648 | B2 | * | 10/2004 | Merot et al. ............. 384/215 |
| 2007/0261922 | A1 |  | 11/2007 | Mullen et al. |
| 2008/0138203 | A1 |  | 6/2008  | Collins et al. |
| 2009/0232432 | A1 | * | 9/2009  | Egami et al. ............. 384/464 |

OTHER PUBLICATIONS

"Overview of materials for Polyetheretherketone, Unreinforced", Matweb.com, retrieved Sep. 18, 2012.*
"DuPont Krytox Aerospace Grade Oils and Greases", Dupont 2010.*

\* cited by examiner

*Primary Examiner* — Richard W Ridley
*Assistant Examiner* — Yamilka Pinero Medina
(74) *Attorney, Agent, or Firm* — Cantor Colburn LLP

(57) ABSTRACT

A mechanical system for high acceleration loading includes a mechanical element configured for rotational movement in a high acceleration environment. The mechanical element possesses a first density. A lubricant having a second density is disposed about the mechanical element. The first and second densities are substantially identical such that the mechanical element is substantially neutrally buoyant in the lubricant.

17 Claims, 3 Drawing Sheets

MECHANICAL SYSTEM FOR HIGH ACCELERATION ENVIRONMENTS

CROSS REFERENCE TO RELATED APPLICATIONS

This application claims the benefit of U.S. Provisional Application No. 61/292,232 filed on Jan. 5, 2010 and which is incorporated by reference herein in its entirety.

BACKGROUND OF THE INVENTION

The subject matter disclosed herein relates to the art of bearing systems and, more particularly, to bearing systems designed for high acceleration environments.

Rotating machinery in highly accelerated (high "g") environments, such as in a helicopter rotor, are subjected to numerous forces that effect bearing performance. Bearings utilized in high "g" environments are subjected to forces that effect, in particular, bearing components, such as bearing cages that are subjected to forces that create accelerated wear characteristics. When bearings are subjected to high "g" forces, lubricant tends to migrate away from surfaces requiring lubrication. As such, frictional forces develop that accelerate wear. The high "g" forces also cause bearing cages to shift relative to other bearing components such as bearing races and rolling elements (balls) resulting in an increased skidding effect. The skidding effect further increases bearing wear and frictional losses. In addition to issues with bearings, other moving components, such as gears and roller screws, also experience issues associated with high "g" environments. The resultant accelerated wear limits the scope of mechanical systems that can be utilized in high "g" environments such as in helicopter rotor systems, supersonic aircraft, space vehicles and the like.

BRIEF DESCRIPTION OF THE INVENTION

According to one aspect of the invention, a mechanical system for high acceleration loading includes a mechanical element configured for rotational movement in a high acceleration environment. The mechanical element possesses a first density. A lubricant having a second density is disposed about the mechanical element. The first and second densities are substantially identical such that the mechanical element is substantially neutrally buoyant in the lubricant.

According to another aspect of the exemplary embodiment, a method of accelerating a mechanical system includes subjecting a mechanical system including a first component, and a second component having a first density, to high acceleration forces. The second component is in a spaced relationship relative to the first component. The method also includes suspending the second component in a lubricant. The lubricant includes a second density. The density of the second component is substantially identical to the density of the lubricant. The method further includes maintaining the spaced relationship between the first component and the second component.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
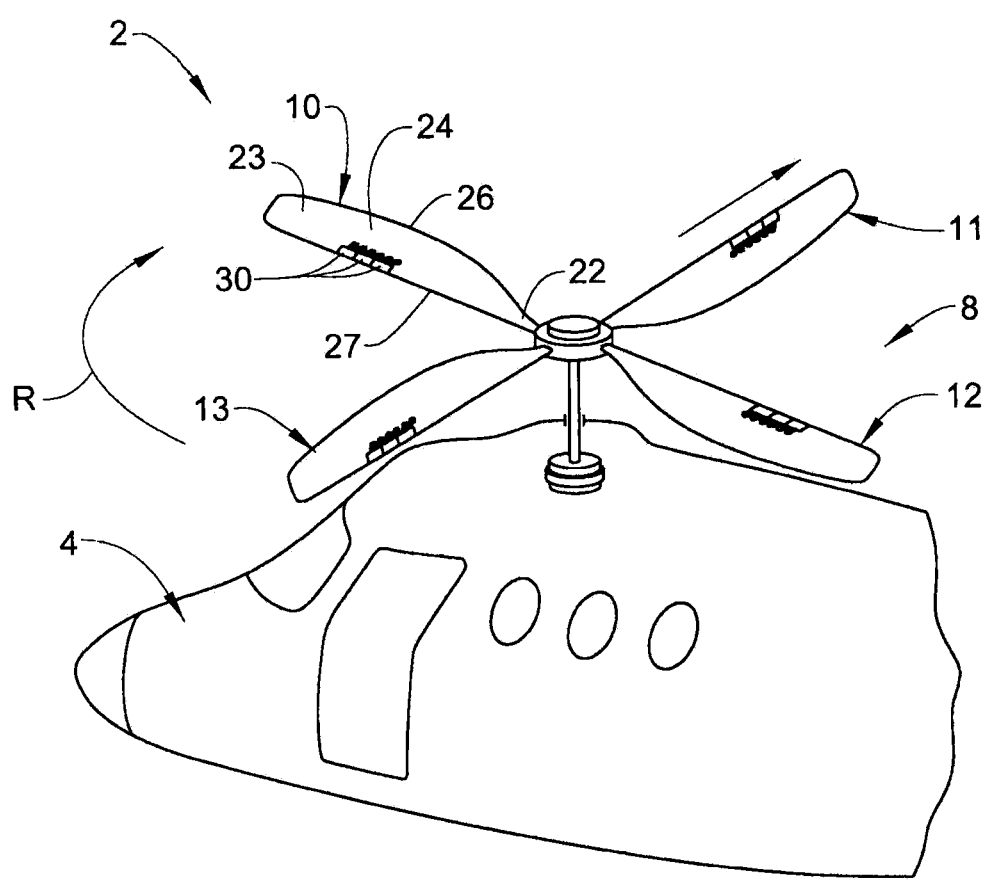
FIG. 1 is a perspective view of a rotary-wing aircraft having mechanical system configured for a high acceleration environment in accordance with an exemplary embodiment.

With reference to FIG. 1, a rotary-wing aircraft, constructed in accordance with an exemplary embodiment, is indicated generally at 2. Rotary-wing aircraft 2 includes an airframe 4 having a rotor system 8 including a plurality of rotor blades 10-13. As each rotor blade 10-13 is substantially similar, a detailed description will follow referencing rotor blade 10 with an understanding that the remaining rotor blades 11-13 contain similar structure. Rotor blade 10 includes a root portion 22 that extends to a tip portion 23 through an airfoil portion 24. Rotor blade 10 is further shown to include a leading edge 26 and an opposing, trailing edge 27. In the exemplary embodiment shown, rotor blade 10 includes a plurality of control flaps 30 disposed thereon.

In the illustrated embodiment, control flaps 30 are disposed on trailing edge 27. As use herein, trailing edge 27 is a portion of the blade 10 that follows or trails the movement of rotor system 8 in the direction indicated by R. Of course, it should be understood that while shown on trailing edge 27, control flaps 30 can also be disposed on leading edge 26 or, any combination of leading edge 26 and trailing edge 27.

In accordance with an exemplary embodiment, pitch of each rotor blade 10 is controlled by the relative position of control flaps 30. Towards that end, control flaps 30 are operatively connected to a mechanical system shown in the form of a motor based actuator 40 in FIG. 2. With this arrangement, control flap 30 can be employed to transmit cyclic control inputs to rotor blade 10 in place of a swash plate assembly as used in the prior art. Further, and when used on leading edge 26, control flaps 30 can be used to impart enhanced performance by delaying retreating blade stall.

Figure 2:
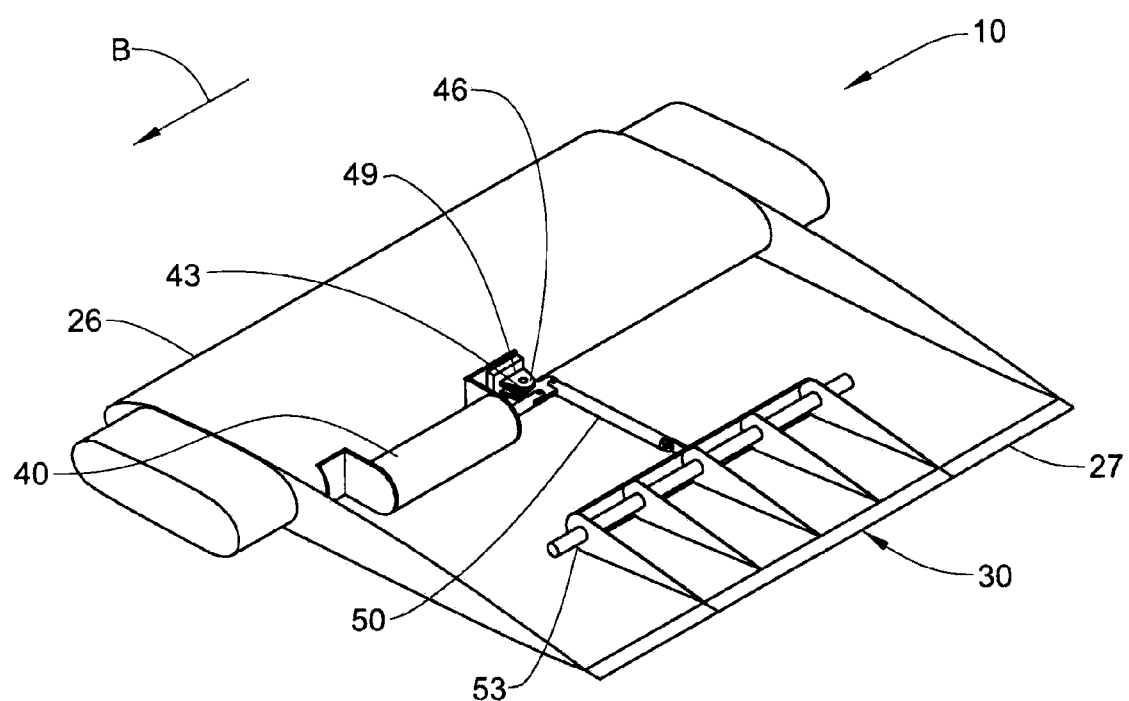
FIG. 2 is a perspective view of a portion of a rotor blade including a mechanical actuator configured for a high acceleration environment in accordance with an exemplary embodiment.

With reference to FIG. 2, motor based actuator 40 includes an output rod 43 connected to control flaps 30 via a transmission part 46. Actuator 40 is configured to extend and retract output rod 43 in a linear direction that is parallel to a radial direction B of rotor 10. Radial direction B is defined as the direction that is generally parallel to a longitudinal axis (not separately labeled) of rotor blade 10. Transmission part 46 is configured to convert the linear extension and retraction of output rod 43 into a positive or negative rotational movement of control flaps 30. Towards that end, transmission part 46 is coupled to a crank 49 and a link 50. Link 50 extends from crank 49 and connects to a shaft 53 that defines a pivotal axis of control flaps 30. With this arrangement, linear extension and retraction of output rod 43 shift control flaps 30 to selectively change a pitch of rotor blade 10.

Figure 3:
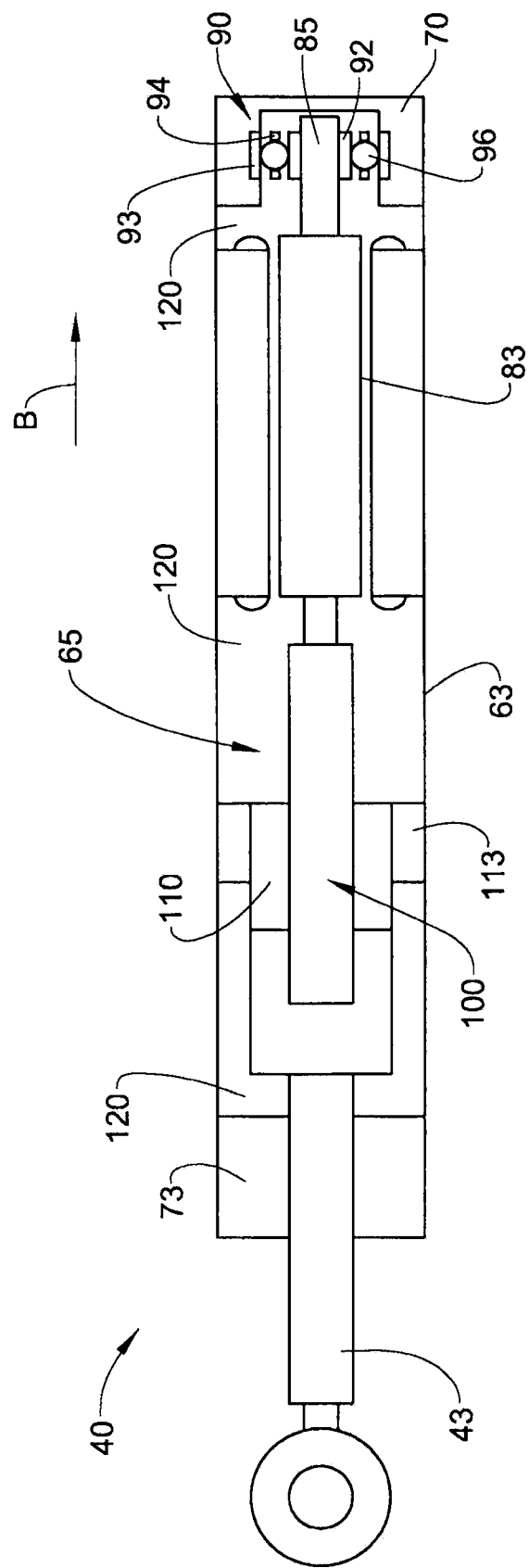
FIG. 3 is a plan view of the mechanical actuator of FIG. 2 in accordance with an exemplary embodiment.

With reference to FIG. 3, actuator 40 includes a housing 63 that defines an interior cavity or lubricant reservoir 65. Housing 43 includes a first seal 70 at a first end thereof and a second seal 73 at a second end thereof First and second seals 70 and 73 are configured to maintain lubricant within internal cavity 65. In the exemplary embodiment, first seal 70 is a fixed seal, while second seal 73 is a sliding seal that allows output rod 43 to extend and retract relative to housing 63.

Housing 63 is further shown to include a brushless permanent magnet motor 83 having a shaft 85 that is free to rotate within a mechanical element or bearing assembly 90. In the exemplary embodiment shown, bearing assembly 90 is positioned proximate to first seal 70. Bearing assembly 90 includes a plurality of mechanical components, e.g. an inner race 92 that is in a spaced relationship with an outer race 93, and a bearing cage 94. A plurality of bearings or balls 96 are arranged between inner race 92 and bearing cage 94. In accordance with one aspect of the exemplary embodiment, balls 96 are formed from a lightweight material, such as Silicon Nitride provide an advantageous reduction in mass. As will be discussed more fully below, bearing assembly 90 is configured to withstand high acceleration environments associated with the operation of rotor blade 10. Housing 63 is also shown to include a transmission member 100 that is configured to convert a rotary movement of shaft 85 into the linear movement of output rod 43 in a direction parallel to the radial direction B. Transmission member 100 includes a linear roller screw (not separately labeled) having a receiving component 110 and an outer screw block 113. In order to minimize wear of the mechanically moving components within actuator 40, an amount of lubricant 120 is disposed within internal cavity 65.

In further accordance with an exemplary embodiment, the amount of lubricant 120 is formed from a substance having a particular density that is matched to the density of material used to form parts of bearing assembly 90 as will be detailed more fully below. Lubricant 120 is preferably formed from one or more chemicals that not only provides a preferred lubrication quality, but also possesses a desired density characteristic. In accordance with one aspect of the exemplary embodiment, the amount of lubricant 120 is a mixture of lubricants that includes fluorinated oil and a hydrocarbon based lubricant, such as mineral oil. Of course, other lubricants and mixtures of lubricants can be employed depending upon the particular lubricating characteristics and density characteristics desired.

In order to minimize forces between bearing cage 94 and other supporting components in bearing assembly 90, bearing cage 94 is formed from a material having a density that closely approximates the density of lubricant 120. That is the density of bearing cage 94 is substantially identical to the density of lubricant 120. By substantially identical, it should be understood that the density of bearing cage 94 is within ±25% of the density of lubricant 120 and vice versa. In accordance with one aspect of the exemplary embodiment, bearing cage 94 is formed from a thermopastic material such as polyketone polymers including polyetheretherketone (PEEK), polyetherketoneketone (PEKK) or Polyaryletherketone (PEAK) (PAEK). Thermopastic materials possess a density about ⅛th of steel and about half that of aluminum and about one third that of titanium. The densities of the thermoplastic materials may be modified by adding fiber such as carbon or glass to the cage material. In addition to altering the density, the fibers will improve material properties for wear etc. Specific gravity of the thermoplastics can vary more than 25%. In any event, by matching the densities, bearing cage 94 is substantially neutrally buoyant within lubricant 120. By making bearing cage 94 substantially buoyant in lubricant 120, bearing cage 94 resists acceleration forces, which, in rotor blade environments may reach 700 g's or more, thus resisting high contact loads that create friction and wear at bearings 96. As such, bearing wear is reduced and maintenance periods for rotor system 8 may be extended.

It should be understood that the present invention provides a system for matching densities between lubricant and mechanical components that are subjected to a high acceleration or G environment in the order of 200 g by suspending mechanical components within a lubricant, acceleration forces that will typically have an impact on the mechanical component are reduced thereby extending an overall operational life of associated mechanical systems. In addition to bearings and bearing cases in rotor systems, the present invention would also be applicable to gears, rotor actuators, clutch systems or the like or any mechanical system that is subjected to a high G environment and also requires lubricant or that can tolerate submersion in a fluid.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A mechanical system for high acceleration loading comprising:
    a mechanical element configured for rotational movement in a high acceleration environment, the mechanical element having a first density; and
    a liquid lubricant disposed about the mechanical element, the liquid lubricant having a second density, wherein the first and second densities are substantially identical such that the mechanical element is substantially neutrally buoyant in the liquid lubricant when subjected to the high acceleration environment.

2. The mechanical system according to claim 1, wherein the mechanical element is a bearing cage configured for rotational movement in the high acceleration environment.

3. The mechanical system according to claim 1, wherein the mechanical element is formed from a polyketone polymer.

4. The mechanical system according to claim 1, wherein the mechanical element is formed from a polyether-ketone polymer.

5. The mechanical system according to claim 4, wherein the polyether-ketone polymer comprises polyetheretherketone (PEEK).

6. The mechanical system according to claim 4, wherein the polyether-ketone polymer comprises polyetherketoneketone (PEKK).

7. The mechanical system according to claim 1, wherein the liquid lubricant is a mixture of lubricants.

8. The mechanical system according to claim 7, wherein the mixture of lubricants includes fluorinated oil.

9. The mechanical system according to claim 7, wherein the mixture of lubricants includes a hydrocarbon based lubricant.

10. The mechanical system according to claim 1, wherein the mechanical system comprises an actuator for a helicopter rotor system.

11. The mechanical system according to claim 10, wherein, the actuator for a helicopter rotor system includes a housing having an interior cavity;

a motor mounted within the interior cavity of the housing, the motor including a rotating motor shaft; and a bearing assembly arranged within the interior cavity about the rotating motor shaft, wherein the mechanical element comprises a bearing cage of the bearing assembly, the bearing cage being formed from the material having the first density, wherein the liquid lubricant is disposed within the interior cavity and sufficient to substantially immerse the bearing assembly, the bearing cage being substantially neutrally buoyant in the liquid lubricant when subjected to the high acceleration environment.

12. The mechanical system according to claim 11, wherein the bearing cage is formed from a polyketone polymer composite.

13. The mechanical system according to claim 12, wherein the polyketone polymer comprises polyetheretherketone (PEEK).

14. The mechanical system according to claim 12, wherein the polyketone polymer comprises polyetherketoneketone (PEKK).

15. A method of accelerating a mechanical system, the method comprising:

subjecting a mechanical system including a first component and a second component having a first density to high acceleration forces, the second component being in a spaced relationship to the first component;

suspending the second component in a liquid lubricant, the liquid lubricant having a second density, wherein the density of the second component is substantially identical to the density of the liquid lubricant; and maintaining the spaced relationship between the first component and the second component.

16. The method of claim 15, further comprising: rotating the second component relative to the first component.

17. A mechanical system for high acceleration loading comprising:

a bearing cage configured for rotational movement in the high acceleration environment, the bearing cage being formed from a polyether-ketone polymer having a first density; and a liquid lubricant disposed about the bearing cage, the liquid lubricant having a second density, wherein the first and second densities are substantially identical such that the bearing cage is substantially neutrally buoyant in the liquid lubricant when subjected to the high acceleration environment.

* * * * *